July 20, 1971  P. I. BERENSHTEIN  3,594,456
METHOD OF CALCINING CERAMIC ARTICLES
Filed Jan. 14, 1970  5 Sheets-Sheet 1

United States Patent Office 3,594,456
Patented July 20, 1971

3,594,456
METHOD OF CALCINING CERAMIC ARTICLES
Peisya Iosifovich Berenshtein, Ulitsa Institutskaya 22a, kv. 4, Saltykovka Moskovskaya Oblast, U.S.S.R.
Filed Jan. 14, 1970, Ser. No. 2,801
Int. Cl. B01j 6/00
U.S. Cl. 263—52    3 Claims

ABSTRACT OF THE DISCLOSURE

A method of calcining ceramic articles such as tiles characterized in that during the dehydration of the ceramic mass at temperatures ranging from 500–700° C. to a temperature which is below the maximal temperature of calcination by not more than 300° C., the calcination process is effected with the rate of the hydrate mass removal constituting 2–40% per 1 minute.

---

The present invention relates to manufacture of ceramic articles and, more particularly, to a method of calcining ceramic articles, for examples, tiles.

Known in the art is a method of calcining ceramic articles having the residual moisture content of less than 0.5%, which consists in that the articles are heated up to a maximal temperature of calcination, are kept at this temperature for a certain period of time, and are then cooled, the rates of heating and cooling being chosen taking into consideration the thermal stresses arising in the articles and determined by the maximumly allowable drops of the temperatures.

The afore-mentioned method is employed in tunnel kilns when the articles are placed on kiln cars, and is characterized by a long term of calcination (25–100 hours). Besides, this method is employed for calcining articles in multi-channel roller kilns manufactured by the CITI Italian firm, when the articles are placed on the refractory trays in one row and the duration of the calcination process constitutes 3–4 hours.

To calcine articles in tunnel kilns, it is necessary to perform a great number of manual operations, such as loading the articles on the cars and unloading thereof, which cannot be mechanized.

When calcining articles in multi-channel roller kilns manufactured by the CITI firm, the tiles have to be placed on the refractory trays and removed therefrom.

It is most expedient, when manufacturing ceramic articles, to dispose the latter in one layer along the height of the kiln, which does not necessitate the employment of any auxiliary operations carried out with a view of placing the articles on the cars, or any other means, and which provides for a conveyer system of production.

However, the known methods of calcination cannot be applied in conveyer production lines when the articles are disposed in one layer along the kiln height, as the long terms of calcination would require a rather great length of the kiln which cannot be allowed in reality.

Attempts to reduce the duration of the calcination process down to less than 2–3 hours by calcining articles at maximal rates determined by thermal stresses resulted in cracking, breakage of the glazed coating and other defects.

It is an object of the present invention to provide a method of calcining ceramic articles, for instance, tiles during a rather short period of time (10–150 min., depending on the composition of the ceramic mass and other factors), that would ensure, at the same time, a high quality of the articles thus produced.

Another object of the present invention is to provide a method of calcining ceramic articles that would allow a conveyer system of production of ceramic articles without effecting any operations requiring manual labour.

The abovementioned and other objects of the present invention are accomplished by that the method of calcining ceramic articles, for example, tiles, having the residual moisture content of less than 0.5%, comprises the following operations: heating of ceramic articles up to 500–700° C. at a maximal rate determined by the thermal stresses; dehydration of the ceramic mass at temperatures ranging from 500–700° C. to a temperature which is less than the calcination temperature by not more than 300° C., the hydrate moisture being removed at a rate of 2–40% per min.; heating of the ceramic articles up to the maximal temperature of calcination at a maximal rate determined by the thermal stresses, keeping of the ceramic articles at the maximal temperature of calcination for a certain period of time, and subsequent cooling of the ceramic articles carried out also at a maximal rate determined by the thermal stresses.

When effecting single-time calcination of glazed ceramic articles, it is expedient to heat the latter in the course of dehydration until at least 90% of the hydrate moisture is removed prior to the beginning of the glaze melting at a rate of the hydrate moisture removal of not more than 10% per 1 minute within one hundred-degree range of the temperatures prior to the start of the glaze melting and a rate of 15–40% per 1 minute at temperatures below this range.

It is expedient prior to dehydration to heat the ceramic articles up to 500–700° C. during 1–10 minutes, and after the dehydration to heat them to the maximal temperature during not more than 5 minutes; to keep the articles at the maximal temperature of calcination during 3–20 minutes and to effect the subsequent cooling by stages: down to 600° C. during 1.5–5 minutes, from 600° C. to 400° C. during 3–15 minutes and below 400° C. during 1.5–4 minutes.

When the duration of the calcination process of ceramic articles, which is characterized by considerably high rates of heating (5.000–10.000 0°/hr.), is rather short, in order to obtain high-quality articles, it is extremely important to select correctly an appropriate rate of heating to be used in the course of the ceramic mass dehydration.

In the course of the dehydration an excessive pressure is built up inside the articles being calcined, the value of said pressure depending upon the properties of the ceramic mass and the thickness of the articles, as well as upon the rate at which the hydrate moisture is removed.

In case the excessive pressure exceeds the strength of the ceramic mass the articles are destroyed completely.

In case of single-time calcination of glazed ceramic articles, if the excessive pressure exceeds the strength of the glazed coating, the latter is broken.

The rate of removal of the hydrate moisture constituting 2–40% per 1 minute (depending upon the properties of the ceramic mass and some other factors) provides for calcination of ceramic articles without any destruction of the latter.

To make the subject matter of the present invention readily understood, considered below are some specific examples of effecting the proposed method, clarified by accompanying drawings.

To make the subject-matter of the present invention readily understood, considered below are some specific examples of effecting the proposed method, clarified by accompanying drawings in which.

Figure 1:
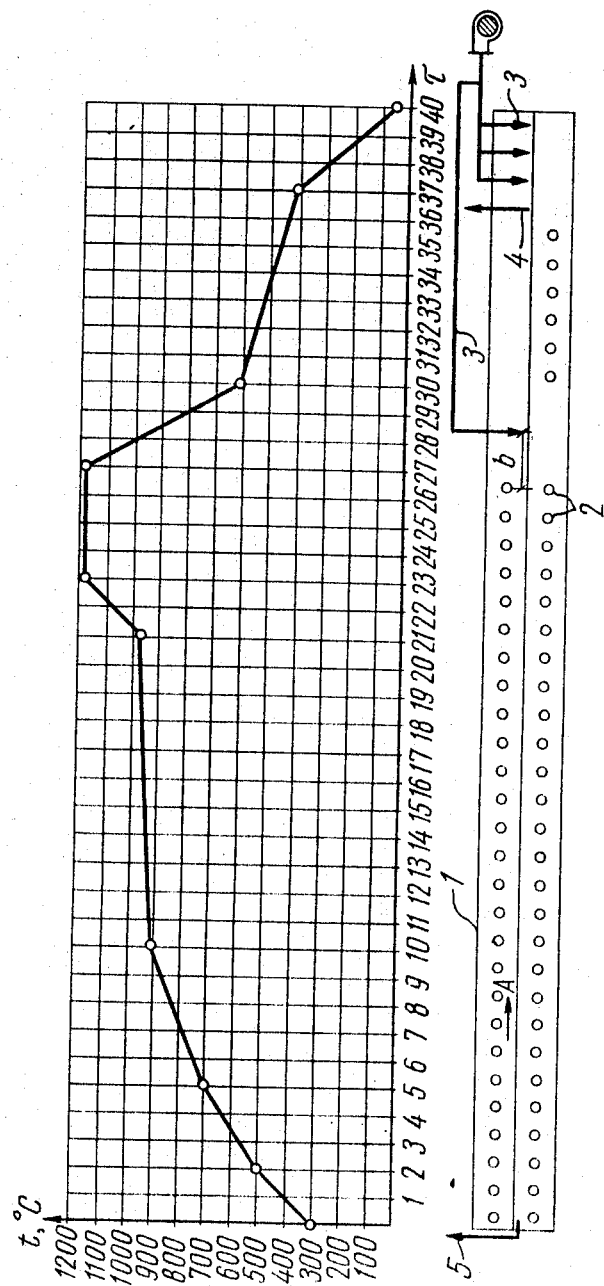
FIG. 1 shows a diagram of dependence between the calcination temperature and time, given in accordance with the disposition of the heat sources and the systems of supply and extraction of air and smoke gases in kilns used when calcinating floor ceramic tiles of the dimensions of 100 x 100 x 10 mm. (where the axis of abscissa is the time, and the axis of ordinate is the temperature of calcination)

The ceramic tiles to be calcined were placed on a roller conveyer of a tunnel clacining kiln 1 (FIGS. 1, 2, 3) in one layer along the kiln height and in several layers along its width. The calcining kiln 1 was equipped with heat sources 2, a system 3 of air supply, a system 4 of air discharge and a system 5 of discharge of smoke gases, providing for distribution of temperatures along the length of the kiln depending on the type of tiles being calcined.

During the whole calcination process, except for the dehydration, the maximal rates of heating and cooling were determined in accordance with the thermal stresses of the articles. The maximumly allowable rates of heating and cooling were determined on the basis of data obtained in accordance with maximumly allowable temperature drops from the following formula:

$$\theta = \frac{a \cdot \Delta t_{max}}{k \cdot S^2}$$

where $\theta$ is the maximumly allowable rate of heating and cooling, in $0°/hr.$;

$\Delta t_{max}$ is the maximumly allowable temperature drop, in $0°$;

$a$ is the coefficient of the temperature conductivity, in $m.^2/hr.$;

S is the thickness of the article, in m.;

K is the coefficient depending upon the shape of the article.

During short terms of the calcination the dehydration of the ceramic mass takes place within the range of temperatures from 500–700° C. down to a temperature which is less than the maximal temperature of calcination by not more than 300° C.

We have found out that during this stage of the calcination the rate of the temperature rise must be such that the rate of removal of the hydrate moisture constitutes 2–40% per 1 minute.

The following are tables showing conditions of calcination of tiles of various types.

TABLE 1

The conditions of calcination of floor tiles with the dimensions of 100×100×10 mm.

| Time, min. | Temperature, 0° C. | Degree of dehydration, percent | Losses during calcination of ceramic mass, percent | Rate of dehydration, percent per min. |
|---|---|---|---|---|
| 0 | 300 | | 7.2 | |
| 2 | 500 | | 7.2 | |
| 5 | 700 | | 6.9 | |
| 10 | 900 | 52 | 3.4 | 10.4 |
| 21 | 950 | 100 | 0 | 4.4 |
| 23 | 1,160 | | | |
| 27 | 1,160 | | | |
| 30 | 600 | | | |
| 37 | 400 | | | |
| 40 | 50 | | | |

TABLE 2

The conditions of calcination of non-glazed facing tiles of the dimension of 150×150×5 mm.

| Time, min. | Temperature, 0° C. | Degree of dehydration, percent | Losses during calcination of ceramic mass, percent | Rate of dehydration, percent per min. |
|---|---|---|---|---|
| 0 | 500 | | 5.3 | |
| 2.5 | 700 | 20 | 4.2 | 8 |
| 1 | 1,150 | 100 | 0 | 32 |
| 5 | 1,150 | | | |
| 8.5 | 600 | | | |
| 95 | 400 | | | |
| 17 | 50 | | | |

TABLE 3

The conditions of calcination of glazed tiles of the dimensions of 150 x 150 x 5 mm.

| Time, min. | Temperature, 0° C. | Degree of dehydration, percent | Losses during calcination of ceramic mass, percent | Rate of dehydration, percent per min. |
|---|---|---|---|---|
| 0 | 400 | | 4.8 | |
| 1 | 500 | | 4.8 | |
| 3.5 | 700 | 20 | 3.8 | 8 |
| 5.5 | 750 | 70 | 1.4 | 25 |
| 11 | 850 | 100 | 0 | 5.4 |
| 13 | 1,050 | | | |
| 18 | 1,050 | | | |
| 21 | 600 | | | |
| 27 | 400 | | | |
| 30 | 50 | | | |

Figure 2:
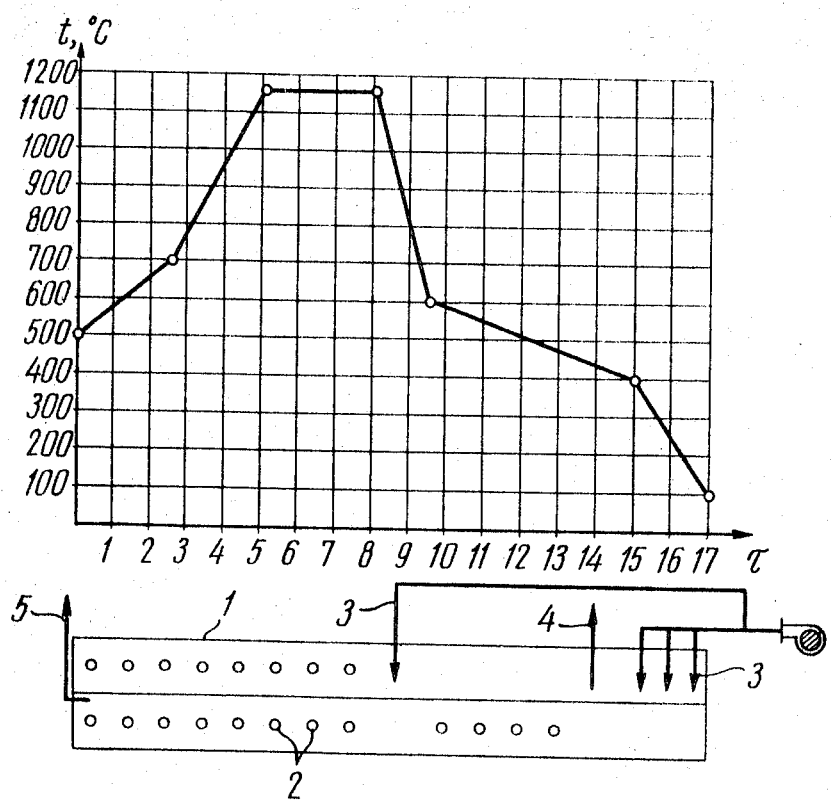
FIG. 2 is ditto, for non-glazed facing tiles of the dimensions of 150 x 150 x 5 mm.
Figure 3:
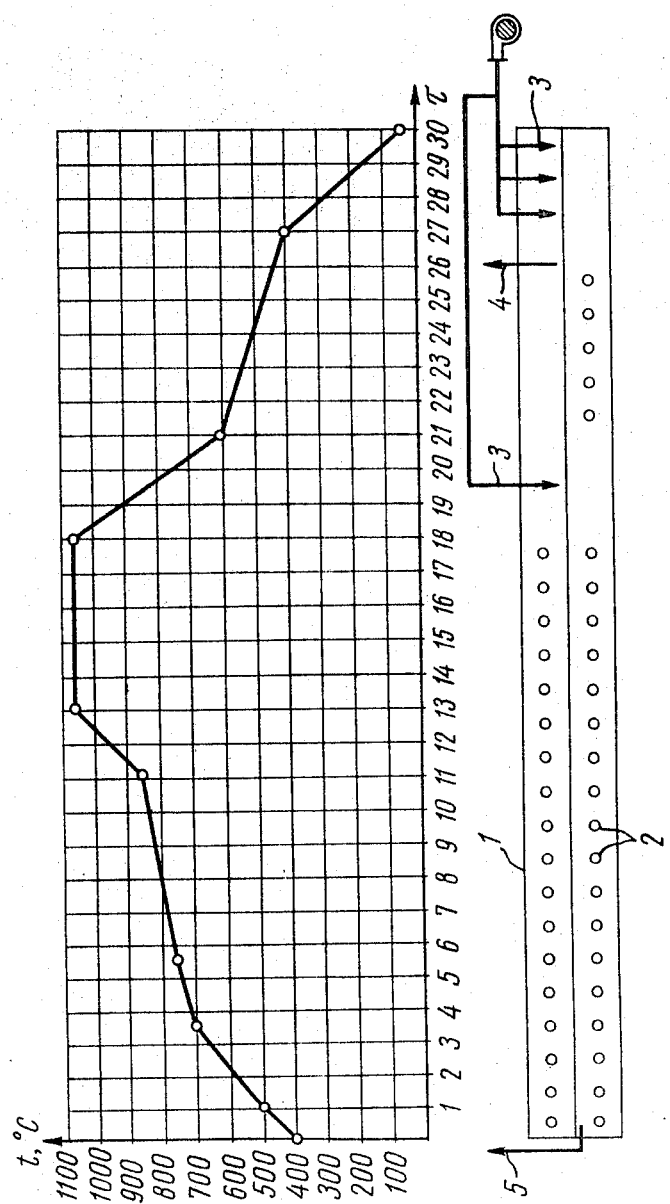
FIG. 3 is ditto, for glazed facing tiles of the dimensions of 150 x 150 x 5 mm.

The afore-given conditions of calcination are graphically shown in FIGS. 1, 2 and 3, respectively.

Figure 4:
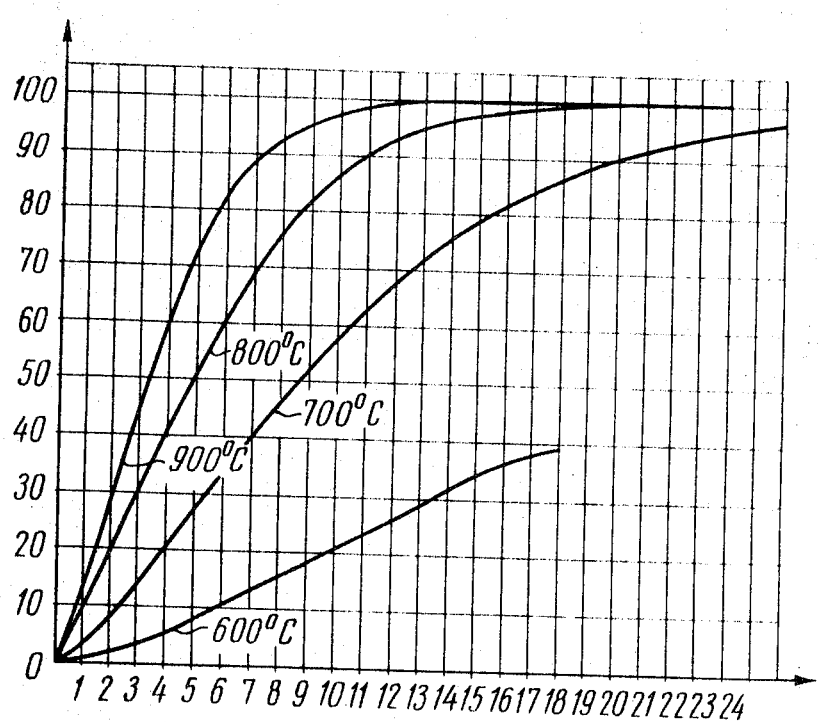
FIG. 4 shows a diagram of dependence of the degree of dehydration (the axis of ordinate) of floor tiles of the dimensions of 100 x 100 x 10 mm. upon the temperature and time of calcination (the axis of abscissa)
Figure 5:
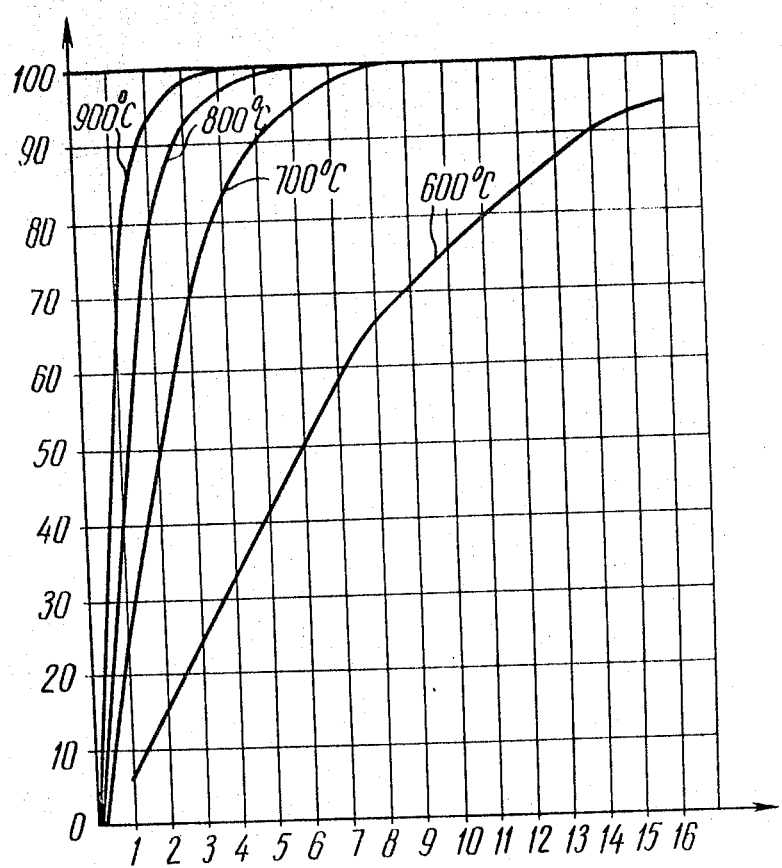
FIG. 5 is ditto, for facing tiles of the dimensions of 150 x 150 x 5 mm.

The degree and rate of the dehydration (removal of the hydrate moisture) may be determined with the aid of the diagrams (FIGS. 4 and 5).

By the degree of dehydration should be understood losses in the weight suffered by the article in the course of calcination, expressed in percent relative to the total value of the losses of the ceramic mass while it is being calcined.

Now we shall consider in detail the calcination conditions of floor tiles of the dimensions of 100 x 100 x 10 mm. from a ceramic mass containing more than 1% of iron oxides (Example 1).

EXAMPLE 1

With tiles having a residual moisture content of 0.1% being displaced in the kiln 1 along the arrow A (FIG. 1), the temperature in the kiln 1 was gradually raised: during 5 minutes it was raised up to 700° C. (Table 1). During the stage of the ceramic mass dehydration within the temperature range of 700–900° C., the average temperature was 800° C., and the time of the temperature rise constituted 5 minutes. From the diagram (FIG. 4) we find the degree of the ceramic mass dehydration for this stage of calcination, which is 52%. The next temperature range is 900–950° C. As we know the time period (11 minutes) during which the temperature was raised, and the average temperature (925° C.) of this period, we can find the degree of the dehydration (100%), which means that the process of the dehydration was completed at 950° C.

The rate of the dehydration is determined by the ratio between the change of the dehydration degree and the duration of this period, and within the temperature range of 700–900° C. constitutes 10.4% per 1 minute, whereas within the temperature range of 900–950° C. it constitutes 4.4% per 1 minute.

I have also found out that for non-glazed tiles which are 10 mm. thick the rate of the dehydration should not exceed 25% per 1 minute.

The rate of the dehydration for tiles from a ceramic mass containing more than 1% of iron oxides should not exceed 15% per 1 minute, and the process of the dehydration should be completed at temperatures which are by 100–300° below the maximal temperature of calcination. The rate of the dehydration for tiles which are 10 mm. thick and made from a ceramic mass containing less than 1% of iron oxides, may be as high as 25% per 1 minute, and the process of the dehydration in this case may be completed at the maximal temperature of calcination.

With the dehydration completed, the tiles while moving along the kiln are heated in the course of 2 minutes up to the maximal temperature of calcination (1160° C.), and are kept at this temperature during 4 minutes, whereupon they are cooled in three stages: firstly, they are sharply cooled down to 600° C. during 3 minutes; secondly, down to 400° C. during 7 minutes; and, then, down to 50° C. during 3 minutes.

At the same time, while the tiles are sharply cooled, the cooling air 3 is supplied into the kiln portion which is disposed from the zone of maximal temperatures at a distance $b$ which does not exceed the length of five articles being calcined. Thus, a temperature buffer is created between the maximal temperature of calcination and a temperature of 600–700° C., which allows to exclude cracking of the articles while they are being cooled.

In the afore-considered example the total duration of the calcination process constituted 40 minutes, and the tiles thus produced had no defects resulting from the process of calcination.

EXAMPLE 2

When calcining ceramic 5 mm.-thick non-glazed tiles, the rate of dehydration was 32% per 1 minute (Table 2 and FIG. 5), and the process of the dehydration was completed at the maximal temperature of calcination (1150° C.).

The tiles were kept at the maximal temperature during 3 minutes (FIG. 2), and were cooled from 1150° C. down to 600° C. during 1.5 minutes, down to 400° C. during 5.5 minutes, and down to 50° C. during 3 minutes.

The total duration of the calcination process constituted 17 minutes and the calcined tiles were of a good quality.

EXAMPLE 3

Ceramic glazed tiles were calcined only once at a maximal temperature of calcination of 1050° C. (Table 3 and FIG. 3).

In the course of calcination the degree of dehydration reached 100% (FIG. 5) at the temperature of the beginning of the glaze melting of 850° C. The rate of dehydration within a one hundred-degree range of temperatures prior to the start of the glaze melting (750-850° C.) was 5.4% per 1 minute, and at a temperature below this range (700–850° C.) —25% per 1 minute.

The tiles were kept at the maximal temperature of calcination (1050° C.) during 5 minutes, and were then cooled from 1050° C. down to 600° C. during 3 minutes, down to 400° C. during 6 minutes, and down to 50° C. during 3 minutes.

The total duration of the calcination process constituted 30 minutes, and the articles thus calcined had no defects.

The afore-cited examples show that the proposed method of calcining ceramic articles makes it possible to considerably reduce the duration of the calcination process (down to 10–150 minutes), and to produce articles having no resultant defects.

Due to the afore-mentioned advantages the proposed method allows to effect a conveyer system of production of ceramic articles, providing for an almost complete economy in manpower thanks to elimination of technological operations requiring manual labour.

With the duration of calcination considerably reduced, it becomes possible to provide highly efficient kilns for calcining ceramic articles disposed on a roller, mesh-belt or some other conveyer in one layer along the height of the kiln.

What I claim is:

1. A method of calcining ceramic articles, such as tiles, having the residual moisture content of less than 0.5%, comprising the following operations: heating up to 500–700° C. at the maximal rate determined by thermal stresses, dehydration of the ceramic mass at temperatures ranging from 500–700° C. to a temperature which is below the maximal temperature of calcination by not more than 300° C. with the rate of the hydrate moisture removal of 2–40% per 1 minute, heating up to the maximal temperature of calcination at the maximal rate determined by the thermal stresses, keeping the articles at the maximal temperature of calcination and subsequent cooling thereof at the maximal rate determined by the thermal stresses.

2. A method according to claim 1, whereby prior to dehydration of the ceramic mass the articles are heated up to 500–700° C. during 1–10 minutes, and after the dehydration they are heated up to the maximal temperature of calcination during not more than 5 minutes, are kept at this temperature during 3–20 minutes and are subsequently cooled by stages: down to 600° C. during 1.5–5 minutes, from 600° C. down to 400° C. during 3–15 minutes, and below 400° C. during 1.5–4 minutes.

3. A method according to claim 1, whereby during a single-time calcination of glazed ceramic articles the latter are heated in the course of dehydration until at least 90% of the hydrate moisture is removed by the beginning of the glaze melting at a rate of not more than 10% of the hydrate moisture per 1 minute within one hundred-degree temperature range before the start of the glaze melting and at a rate of 15–35% per 1 minute at temperatures below this range.

References Cited

UNITED STATES PATENTS

| 1,338,771 | 5/1920 | Harrop | 263—28X |
| 3,325,157 | 6/1967 | Cook | 263—28 |

JOHN J. CAMBY, Primary Examiner